US008145361B2

(12) United States Patent
Forbes, Jr. et al.

(10) Patent No.: US 8,145,361 B2
(45) Date of Patent: Mar. 27, 2012

(54) SYSTEM AND METHOD FOR MANIPULATING CONTROLLED ENERGY USING DEVICES TO MANAGE CUSTOMER BILLS

(75) Inventors: Joseph W. Forbes, Jr., Wake Forest, NC (US); Joel L. Webb, Raleigh, NC (US); Roy Moore, Boca Raton, FL (US)

(73) Assignee: Consert, Inc., San Antonio, TX (US)

( * ) Notice: Subject to any disclaimer, the term of this patent is extended or adjusted under 35 U.S.C. 154(b) by 307 days.

(21) Appl. No.: 12/702,785

(22) Filed: Feb. 9, 2010

(65) Prior Publication Data

US 2010/0198713 A1    Aug. 5, 2010

Related U.S. Application Data

(63) Continuation-in-part of application No. 11/895,909, filed on Aug. 28, 2007, now Pat. No. 7,715,951.

(60) Provisional application No. 61/177,007, filed on May 11, 2009, provisional application No. 61/150,978, filed on Feb. 9, 2009.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G01R 21/00* | (2006.01) |
| *G01R 21/06* | (2006.01) |
| *G06Q 10/00* | (2012.01) |
| *G06Q 30/00* | (2006.01) |

(52) U.S. Cl. .......... 700/291; 700/36; 700/286; 700/295; 705/7.29; 705/7.31; 705/7.35; 702/60; 702/61; 702/62

(58) Field of Classification Search ............... 700/36, 700/286, 291, 295; 705/7.29, 7.31, 7.35; 702/60–62
See application file for complete search history.

(56) References Cited

U.S. PATENT DOCUMENTS

| | | |
|---|---|---|
| 3,906,242 A | 9/1975 | Stevenson |
| 4,023,043 A | 5/1977 | Stevenson |

(Continued)

FOREIGN PATENT DOCUMENTS

EP    1729223    12/2006

(Continued)

OTHER PUBLICATIONS

PCT/US2010/034418, "International Search Report".

(Continued)

*Primary Examiner* — Ramesh Patel
(74) *Attorney, Agent, or Firm* — Womble Carlyle Sandridge & Rice, LLP (57) ABSTRACT

A control system and method to create an Internet Protocol (IP) enabled automatic gain control loop for encasing a desired cost value in a utility derived consumer controlled pricing envelope. A customer uses a web browser to view billing estimates for the current month as well as related months. The customer can set limits on the actual billing amount for the upcoming month and make adjustments to this amount if it seems unrealistic in the coming month. Control event actions are carried out to limit power usage within preferences set by the customer.

44 Claims, 7 Drawing Sheets

U.S. PATENT DOCUMENTS

| | | | |
|---|---|---|---|
| 4,589,075 | A | 5/1986 | Buennagel |
| 4,799,059 | A | 1/1989 | Grindahl et al. |
| 5,237,507 | A | 8/1993 | Chasek |
| 5,388,101 | A | 2/1995 | Dinkins |
| 5,481,546 | A | 1/1996 | Dinkins |
| 5,495,239 | A * | 2/1996 | Ouellette ............... 340/870.02 |
| 5,553,094 | A * | 9/1996 | Johnson et al. ............. 375/130 |
| 5,570,002 | A | 10/1996 | Castleman |
| 5,592,491 | A | 1/1997 | Dinkins |
| 5,675,503 | A | 10/1997 | Moe et al. |
| 5,682,422 | A * | 10/1997 | Oliver ...................... 379/106.03 |
| 5,748,104 | A * | 5/1998 | Argyroudis et al. ..... 340/870.11 |
| 6,018,690 | A | 1/2000 | Saito et al. |
| 6,047,274 | A * | 4/2000 | Johnson et al. ................ 705/412 |
| 6,078,785 | A * | 6/2000 | Bush ................................ 455/7 |
| 6,122,603 | A * | 9/2000 | Budike, Jr. ...................... 702/182 |
| 6,178,362 | B1* | 1/2001 | Woolard et al. ............... 700/295 |
| 6,185,483 | B1* | 2/2001 | Drees ............................ 700/295 |
| 6,216,956 | B1 | 4/2001 | Elhers et al. |
| 6,233,327 | B1 | 5/2001 | Petite |
| 6,519,509 | B1 | 2/2003 | Nierlich et al. |
| 6,535,797 | B1 | 3/2003 | Bowles et al. |
| 6,577,962 | B1 | 6/2003 | Afshari |
| 6,601,033 | B1 | 7/2003 | Sowinski |
| 6,621,179 | B1 | 9/2003 | Howard |
| 6,622,097 | B2 | 9/2003 | Hunter |
| 6,633,823 | B2 | 10/2003 | Bartone et al. |
| 6,681,154 | B2 | 1/2004 | Nierlich et al. |
| 6,687,574 | B2 | 2/2004 | Pietrowicz et al. |
| 6,732,055 | B2 | 5/2004 | Bagepalli et al. |
| 6,778,882 | B2 | 8/2004 | Spool et al. |
| 6,784,807 | B2 | 8/2004 | Petite et al. |
| 6,785,592 | B1* | 8/2004 | Smith et al. .................... 700/291 |
| 6,832,135 | B2 | 12/2004 | Ying |
| 6,834,811 | B1 | 12/2004 | Huberman et al. |
| 6,836,737 | B2 | 12/2004 | Petite et al. |
| 6,862,498 | B2 | 3/2005 | Davis et al. |
| 6,865,450 | B2 | 3/2005 | Masticola et al. |
| 6,868,293 | B1 | 3/2005 | Schurr et al. |
| 6,879,059 | B2 | 4/2005 | Sleva |
| 6,891,838 | B1 | 5/2005 | Petite et al. |
| 6,904,336 | B2 | 6/2005 | Raines et al. |
| 6,906,617 | B1 | 6/2005 | Van der Meulen |
| 6,909,942 | B2 | 6/2005 | Andarawis et al. |
| 6,914,533 | B2 | 7/2005 | Petite |
| 6,914,893 | B2 | 7/2005 | Petite |
| 6,934,316 | B2 | 8/2005 | Cornwall et al. |
| 7,019,667 | B2 | 3/2006 | Petite et al. |
| 7,053,767 | B2 | 5/2006 | Petite et al. |
| 7,088,014 | B2 | 8/2006 | Nierlich et al. |
| 7,103,511 | B2 | 9/2006 | Petite |
| 7,130,719 | B2* | 10/2006 | Ehlers et al. ................... 700/276 |
| 7,133,750 | B2 | 11/2006 | Raines et al. |
| 7,181,320 | B2 | 2/2007 | Whiffen et al. |
| 7,184,861 | B2 | 2/2007 | Petite |
| 7,200,134 | B2 | 4/2007 | Proctor, Jr. et al. |
| 7,206,670 | B2 | 4/2007 | Pimputkar et al. |
| 7,209,804 | B2 | 4/2007 | Curt et al. |
| 7,209,840 | B2 | 4/2007 | Petite et al. |
| 7,233,843 | B2 | 6/2007 | Budhraja et al. |
| 7,263,073 | B2 | 8/2007 | Petite et al. |
| 7,274,975 | B2 | 9/2007 | Miller |
| 7,289,887 | B2 | 10/2007 | Rodgers |
| 7,295,128 | B2 | 11/2007 | Petite |
| 7,305,282 | B2 | 12/2007 | Chen |
| 7,313,465 | B1 | 12/2007 | O'Donnell |
| 7,343,341 | B2 | 3/2008 | Sandor et al. |
| 7,345,998 | B2 | 3/2008 | Cregg et al. |
| 7,346,463 | B2 | 3/2008 | Petite et al. |
| 7,397,907 | B2 | 7/2008 | Petite |
| 7,406,364 | B2 | 7/2008 | Andren et al. |
| 7,412,304 | B2 | 8/2008 | Uenou |
| 7,424,527 | B2 | 9/2008 | Petite |
| 7,440,871 | B2 | 10/2008 | McConnell et al. |
| 7,468,661 | B2 | 12/2008 | Petite et al. |
| 7,480,501 | B2 | 1/2009 | Petite |
| 7,536,240 | B2 | 5/2009 | McIntyre et al. |
| 7,541,941 | B2 | 6/2009 | Bogolea et al. |
| 7,565,227 | B2 | 7/2009 | Richard et al. |
| 7,650,425 | B2 | 1/2010 | Davis et al. |
| 7,697,492 | B2 | 4/2010 | Petite |
| 7,711,796 | B2 | 5/2010 | Gutt et al. |
| 7,738,999 | B2 | 6/2010 | Petite |
| 7,739,378 | B2 | 6/2010 | Petite |
| 2001/0038343 | A1 | 11/2001 | Meyer et al. |
| 2002/0019802 | A1 | 2/2002 | Malme et al. |
| 2002/0035496 | A1 | 3/2002 | Fujushima et al. |
| 2002/0109607 | A1 | 8/2002 | Cumeralto et al. |
| 2002/0138176 | A1 | 9/2002 | Davis et al. |
| 2002/0143693 | A1 | 10/2002 | Soestbergen et al. |
| 2003/0036820 | A1 | 2/2003 | Yellepeddy |
| 2003/0083980 | A1 | 5/2003 | Satake |
| 2003/0144864 | A1 | 7/2003 | Mazzarella |
| 2003/0225483 | A1 | 12/2003 | Santinato et al. |
| 2003/0229572 | A1 | 12/2003 | Raines et al. |
| 2003/0233201 | A1 | 12/2003 | Horst et al. |
| 2004/0006439 | A1 | 1/2004 | Hunter |
| 2004/0088083 | A1 | 5/2004 | Davis et al. |
| 2004/0095237 | A1 | 5/2004 | Chen et al. |
| 2004/0128266 | A1 | 7/2004 | Yellepeddy et al. |
| 2004/0158478 | A1 | 8/2004 | Zimmerman |
| 2004/0162793 | A1 | 8/2004 | Scott et al. |
| 2004/0193329 | A1 | 9/2004 | Ransom et al. |
| 2005/0033481 | A1 | 2/2005 | Budhraja et al. |
| 2005/0065742 | A1 | 3/2005 | Rodgers |
| 2005/0096856 | A1 | 5/2005 | Lubkeman et al. |
| 2005/0096857 | A1 | 5/2005 | Hunter |
| 2005/0116836 | A1* | 6/2005 | Perry et al. ............... 340/870.02 |
| 2005/0125243 | A1 | 6/2005 | Villalobos |
| 2005/0192711 | A1 | 9/2005 | Raines et al. |
| 2005/0216302 | A1 | 9/2005 | Raji et al. |
| 2005/0216580 | A1 | 9/2005 | Raji et al. |
| 2005/0240314 | A1 | 10/2005 | Martinez |
| 2005/0240315 | A1 | 10/2005 | Booth et al. |
| 2005/0246190 | A1 | 11/2005 | Sandor et al. |
| 2005/0267642 | A1 | 12/2005 | Whiffen et al. |
| 2006/0020544 | A1 | 1/2006 | Kaveski |
| 2006/0022841 | A1 | 2/2006 | Hoiness et al. |
| 2006/0025891 | A1 | 2/2006 | Budike |
| 2006/0031934 | A1 | 2/2006 | Kriegel |
| 2006/0106635 | A1 | 5/2006 | Ulrich et al. |
| 2006/0161450 | A1 | 7/2006 | Carey et al. |
| 2006/0168191 | A1 | 7/2006 | Ives |
| 2006/0195334 | A1 | 8/2006 | Reeb et al. |
| 2006/0271244 | A1 | 11/2006 | Cumming et al. |
| 2006/0271314 | A1 | 11/2006 | Hayes |
| 2007/0058629 | A1 | 3/2007 | Luft |
| 2007/0085702 | A1 | 4/2007 | Walters et al. |
| 2007/0100503 | A1 | 5/2007 | Balan et al. |
| 2007/0203722 | A1 | 8/2007 | Richards et al. |
| 2007/0204176 | A1 | 8/2007 | Shaffer et al. |
| 2007/0213878 | A1 | 9/2007 | Chen |
| 2007/0255457 | A1 | 11/2007 | Whitcomb et al. |
| 2007/0286210 | A1 | 12/2007 | Gutt et al. |
| 2008/0015976 | A1 | 1/2008 | Sandor et al. |
| 2008/0091625 | A1 | 4/2008 | Kremen |
| 2008/0130673 | A1 | 6/2008 | Cregg et al. |
| 2008/0147465 | A1 | 6/2008 | Raines et al. |
| 2008/0172312 | A1 | 7/2008 | Synesiou et al. |
| 2008/0177423 | A1 | 7/2008 | Brickfield et al. |
| 2008/0177678 | A1 | 7/2008 | Di Martini |
| 2008/0224892 | A1 | 9/2008 | Bogolea et al. |
| 2008/0238710 | A1 | 10/2008 | Tolnar et al. |
| 2008/0255899 | A1 | 10/2008 | McConnell et al. |
| 2008/0281473 | A1 | 11/2008 | Pitt |
| 2009/0018884 | A1 | 1/2009 | McConnell et al. |
| 2009/0043519 | A1 | 2/2009 | Bridges et al. |
| 2009/0043520 | A1 | 2/2009 | Pollack et al. |
| 2009/0055031 | A1 | 2/2009 | Slota et al. |
| 2009/0062970 | A1 | 3/2009 | Forbes, Jr. |
| 2009/0063228 | A1 | 3/2009 | Forbes, Jr. |
| 2009/0112758 | A1 | 4/2009 | Herzig |
| 2009/0135836 | A1 | 5/2009 | Veillette |
| 2009/0187499 | A1 | 7/2009 | Mulder et al. |
| 2009/0240381 | A1 | 9/2009 | Lane |
| 2010/0106575 | A1 | 4/2010 | Bixby et al. |
| 2010/0191862 | A1 | 7/2010 | Forbes, Jr. et al. |

| | | | |
|---|---|---|---|
| 2010/0235008 | A1 | 9/2010 | Forbes, Jr. |
| 2011/0022239 | A1 | 1/2011 | Forbes, Jr. |
| 2011/0029655 | A1 | 2/2011 | Forbes, Jr. |
| 2011/0251807 | A1* | 10/2011 | Rada et al. .............. 702/61 |

FOREIGN PATENT DOCUMENTS

| | | |
|---|---|---|
| JP | 2000078748 | 3/2000 |
| JP | 2001306839 | 11/2001 |
| JP | 2004180412 | 6/2004 |
| JP | 2006060911 | 3/2006 |
| JP | 2007132553 | 5/2007 |
| KR | 2005001584 | 1/2005 |
| KR | 10-2006-0036171 | 4/2006 |
| KR | 10-0701298 | 3/2007 |
| KR | 10-2007-0098172 | 10/2007 |
| KR | 10-2008-0112692 | 12/2008 |
| WO | WO 2007136456 | 11/2007 |
| WO | WO 2008125696 | 10/2008 |
| WO | WO 2009032161 | 3/2009 |
| WO | WO 2009032162 | 3/2009 |
| WO | WO 2010129059 | 11/2010 |
| WO | WO 2010129958 | 11/2010 |
| WO | WO 2010132456 | 11/2010 |
| WO | WO 2010132469 | 11/2010 |
| WO | WO 2010132477 | 11/2010 |
| WO | WO 2010134987 | 11/2010 |
| WO | WO 2011043818 | 4/2011 |
| WO | WO 2011046589 | 4/2011 |

OTHER PUBLICATIONS

PCT/US2010/034418, "Written Opinion of the International Searching Authority".

Inoue et al., "Network Architecture for Home Energy Management System", IEEE Transactions on Consumer Electronics, vol. 49, Issue 3, pp. 606-613, Aug. 2003.

Paul Darbee, INSTEON The Details, Smarthouse, Inc., Aug. 11, 2005, 68 pages.

Paul Darbee, INSTEON Compared, SmartLabs, Inc., Jan. 2, 2006, 69 pages.

Allowing for Household Preferences in Emission Trading, A Contribution to the Climate Policy Debate, Michael Ahlheim and Friedrich Schneider, Environmental and Resource Economics 21: 317-342, 2002 Kluwer Academic Publishers, Printed in the Netherlands (26 pages).

Environmental and economic benefits resulting from citizens' participation in CO2 emissions trading: An efficient alternative solution to the voluntary compensation of CO2 emissions, Olivier Rousse, Energy Policy 36 (2008) 388-397 (10 pages).

B.J. Kirby, Spinning Reserve from Responsive Loads, Oak Ridge National Laboratory, United States Dept. of Energy, Mar. 2003 (54 pages).

Eric Hirst and Brendan Kirby, Opportunities for Demand Participation in New England Contingency-Reserve Markets, New England Demand Response Initiative, Feb. 2003 (15 pages).

Pablo A. Ruiz and Peter W. Sauer, Valuation of Reserve Services, IEEE Proceedings of the 41$^{st}$ Hawaii International Conference on System Sciences, 2008 (9 pages).

Eric Hirst and Richard Cowart, Demand Side Resources and Reliability, New England Demand Response Initiative, Mar. 20, 2002 (32 pages).

C.W. Gellings and W.M. Smith, Integrating Demand-Side Management into Utility Planning, Proceedings of the IEEE, vol. 77, Issue: 6, Jun. 1989, pp. 908-918 (Abstract only).

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

* cited by examiner

SYSTEM AND METHOD FOR MANIPULATING CONTROLLED ENERGY USING DEVICES TO MANAGE CUSTOMER BILLS

CROSS-REFERENCE TO RELATED APPLICATIONS

This application is a continuation-in-part of U.S. patent application Ser. No. 11/895,909, filed on Aug. 28, 2007. This application claims the benefit of provisional patent application Ser. No. 61/177,007, filed on May 11, 2009, and provisional patent application 61/150,978 filed on Feb. 9, 2009. The specification and drawings of the provisional patent applications are specifically incorporated by reference herein. This application is also related to commonly-owned U.S. patent application Ser. No. 12/001,819, filed on Dec. 13, 2007.

BACKGROUND OF THE INVENTION

1. Field of the Invention

The present disclosure relates generally to electrical power load control systems and, more particularly, to manipulating controlled energy using devices at a service point for the purpose of placing a customer's bill within a controlled pricing envelope.

2. Description of Related Art

Various types of billing arrangements are in use by utilities, including "flat rate," "time of use," "comprehensive protection plan," "average rate," and other types of billing for end commercial or residential utility customers. Currently, electric utilities provide limited tools to allow customers to limit or manage their energy bills. Utilities may offer flat rate billing to help customers limit their bills.

However, there is no interactive feedback from utilities to help customers know if they are projected to exceed the energy usage that the customer desires. Feedback only comes in the form of the next bill, when it is too late to make changes for the previous billing period.

Finally, if customers want to take actions to limit energy usage, there are a variety of manual, time-consuming tasks that the customer can perform, such as lowering the thermostat, reducing showers, manually turning off the water heater when away, etc. There is no single simple approach that the customer can use to specify actions to limit the current energy bill.

SUMMARY OF THE INVENTION

Embodiments of the invention are directed to a control system and method to create an Internet Protocol (IP) enabled automatic gain control loop for the purpose of encasing a desired cost value in a utility derived consumer controlled pricing envelope. A customer uses a web browser to view billing estimates for the current month as well as related months. The customer can set limits on the actual billing amount for the upcoming month and make adjustments to this amount if it seems unrealistic in the coming month. The embodiments carry out control event actions to limit power usage within preferences set by the customer.

In one embodiment, a method is provided for controlling a power-consuming device at a service point to manage a customer's electrical bills using a communications network between a server in communication with an electric utility and a client device at the service point. A plurality of customer bill management settings is transmitted to the server from the client device at the service point including at least a target energy usage for a specified billing period. The plurality of customer bill management settings is stored in a database for use in energy usage control events. A current meter reading is determined by the client device at the service point. An energy usage control event is scheduled for the power-consuming device at the service point based on the current meter reading and the target energy usage. The energy usage control event is sent to the power-consuming device at a scheduled time to control an energy usage at the service point. The energy usage at the service point is determined during a specified time interval. A projected energy usage, based on the energy usage during the specified time interval, is compared with the target energy usage for the specified billing period. A determination is made whether or not the projected energy usage exceeds the target energy usage during the billing period.

In one embodiment, a system is provided for controlling a power-consuming device at a service point to manage a customer's electrical bills using a communications network between a server in communication with an electric utility and a client device at the service point. The system includes a memory storing a database for use in energy usage control events containing a plurality of customer bill management settings including at least a target energy usage for a specified billing period; and a processor, cooperative with the memory, and configured for managing the customer's electrical bills using the communications network by: determining a current meter reading by the client device at the service point; scheduling an energy usage control event for the power-consuming device at the service point based on the current meter reading and the target energy usage; sending the energy usage control event to the power-consuming device at a scheduled time to control an energy usage at the service point; determining the energy usage at the service point during a specified time interval; comparing a projected energy usage, based on the energy usage during the specified time interval, with the target energy usage for the specified billing period; and determining if the projected energy usage exceeds the target energy usage during the billing period.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION

Before describing exemplary embodiments in detail, it should be observed that the embodiments reside primarily in combinations of apparatus components and processing steps related to actively managing power loading on an individual subscriber basis and optionally tracking power savings incurred by both individual subscribers and an electric utility. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The term "electric utility" refers to any entity that generates and distributes electrical power to its customers, that purchases power from a power-generating entity and distributes the purchased power to its customers, or that supplies electricity created by alternative energy sources, such as solar power, wind power or otherwise, to power generation or distribution entities through the Federal Energy Regulatory Commission (FERC) electrical grid or otherwise.

The embodiments described utilize concepts disclosed in commonly-owned published patent application US 2009/0062970, entitled "System and Method for Active Power Load Management" which is incorporated by reference in its entirety herein. The following paragraphs describe the Active Management Load System (ALMS), Active Load Director (ALD), and Active Load Client (ALC) in sufficient detail to assist the reader in the understanding of the embodiments described herein. More detailed description of the ALMS, ALD, and ALC can be found in US 2009/0062970.

Active Load Management System

Figure 1:
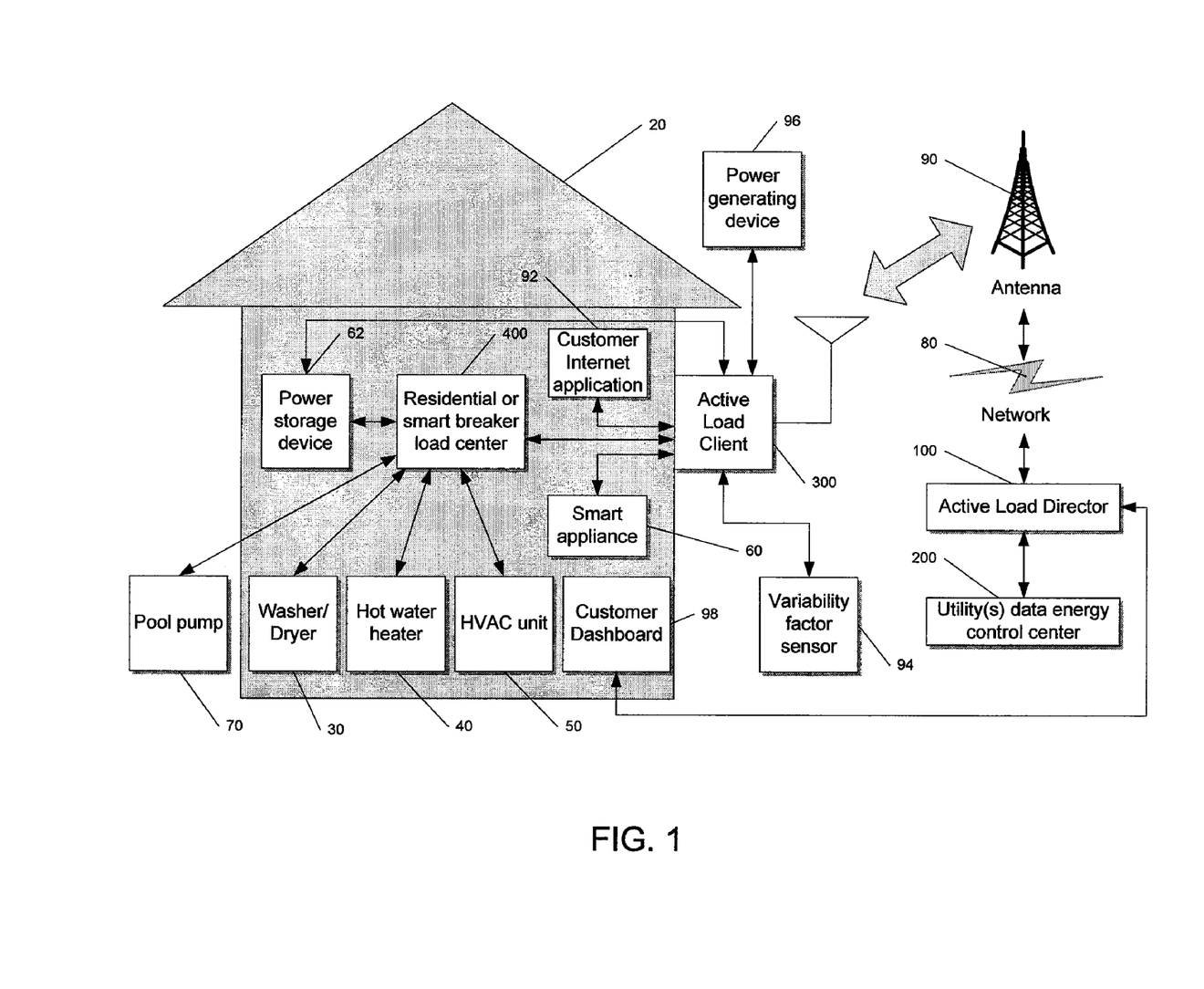
FIG. 1 is a block diagram of an exemplary IP-based, active power load management system.

FIG. 1 depicts an exemplary IP-based Active Load Management System (ALMS) 10 that may be utilized by a utility in the embodiments described herein. The exemplary ALMS 10 monitors and manages power distribution via an active load director (ALD) 100 connected between one or more utility control centers (UCCs) 200 and one or more Active Load Clients (ALCs) 300. The ALD 100 may communicate with the utility control center 200 and each active load client 300 either directly or through a network 80 using the Internet Protocol (IP) or any other connection-based protocols. For example, the ALD 100 may communicate using RF systems operating via one or more base stations 90 using one or more well-known wireless communication protocols. Alternatively, or additionally, the ALD 100 may communicate via a digital subscriber line (DSL) capable connection, cable television based IP capable connection, or any combination thereof. In the exemplary embodiment shown in FIG. 1, the ALD 100 communicates with one or more active load clients 300 using a combination of traditional IP-based communication (e.g., over a trunked line) to a base station 90 and a wireless channel implementing the WiMax protocol for the "last mile" from the base station 90 to the active load client 300.

Each ALC 300 is accessible through a specified address (e.g., IP address) and controls and monitors the state of individual smart breaker modules or intelligent appliances 60 installed in the business or residence 20 to which the ALC 300 is associated (e.g., connected or supporting). Each ALC 300 is associated with a single residential or commercial customer. In one embodiment, the ALC 300 communicates with a residential load center 400 that contains smart breaker modules, which are able to switch from an "ON" (active) state to an "OFF" (inactive) state, and vice versa, responsive to signaling from the ALC 300. Smart breaker modules may include, for example, smart breaker panels manufactured by Schneider Electric SA under the trademark "Square D" or by Eaton Corporation under the trademark "Cutler-Hammer" for installation during new construction. For retrofitting existing buildings, smart breakers having means for individual identification and control may be used. Typically, each smart breaker controls a single appliance (e.g., a washer/dryer 30, a hot water heater 40, an HVAC unit 50, or a pool pump 70).

Additionally, the ALC 300 may control individual smart appliances directly (e.g., without communicating with the residential load center 400) via one or more of a variety of known communication protocols (e.g., IP, Broadband over Power Line (BPL) in various forms, including through specifications promulgated or being developed by the HOMEPLUG Powerline Alliance and the Institute of Electrical and Electronics Engineers (IEEE), Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

Also as shown in FIG. 1, a service point 20 may have its own power generation on-site, including solar panels, fuel cells, or wind turbines. This is indicated by the power generating device 96. The power generating device 96 connects to the Active Load Client 300. Power that is added by the power generating device 96 is added to the overall utility capacity. The utility provides credit to the service point owner based on the energy produced at the service point.

The service point 20 also contains the Customer Dashboard 98 (also referred to herein as Customer Console). In one embodiment, this is a web-based interface used by the customer to specify preferences for the use of the Active Load Management System at the customer's service point using any wireless or wireline protocol including, but not limited to, WiMax, CDMA, HSPA, and LTE which are described in more detail below. In another embodiment, the customer web-based interface can be provided using any display device connected via a cable television-based protocol, or via an application within a device (e.g., smart phone) that emulates a web-based interface. These preferences include control event preferences, bill management preferences, and others. Although the web browser is shown within the service point 20, the customer may use a web browser from any location that can access the Active Load Director Server 100, including Internet connections at work, at public terminals, over mobile communication devices, etc.

Active Load Director

Figure 2:
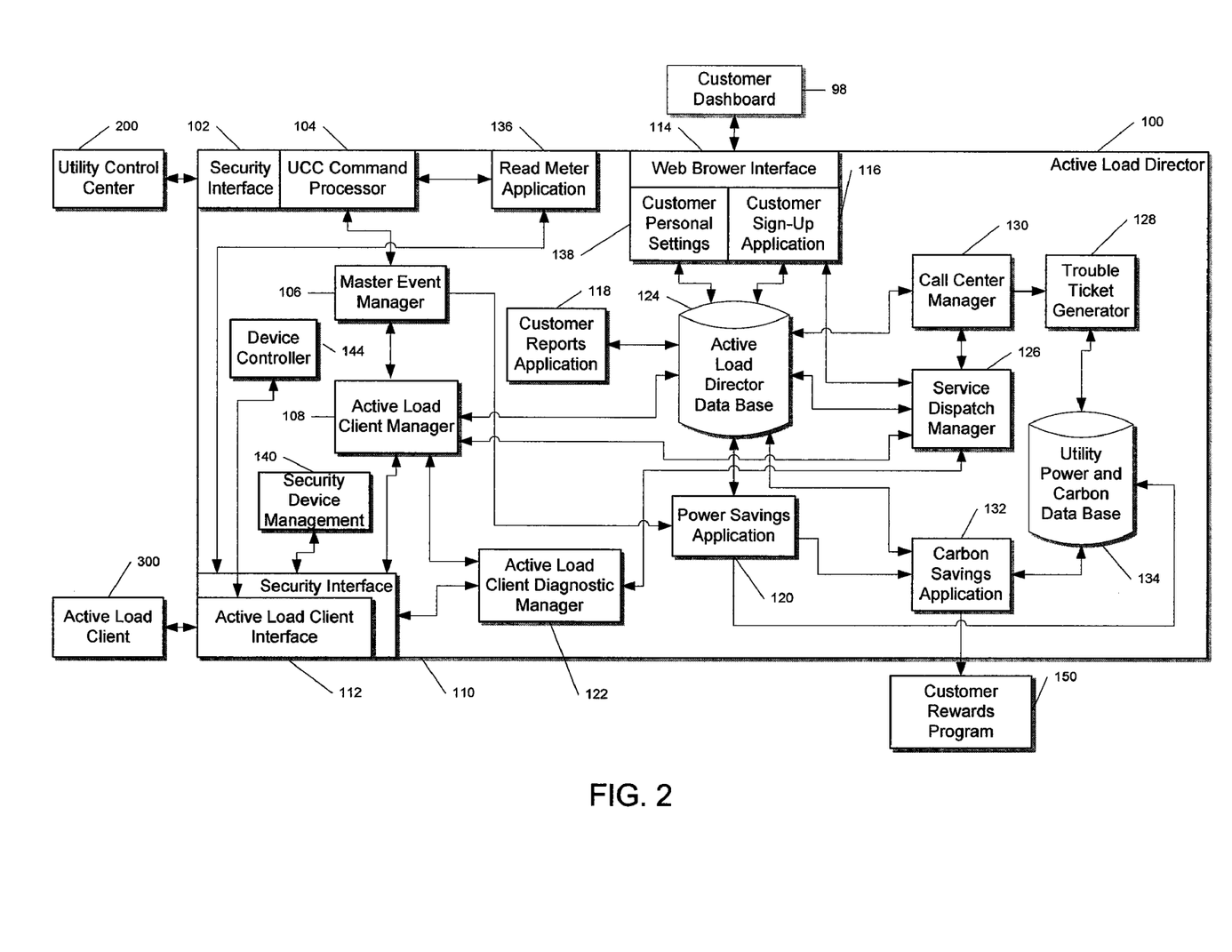
FIG. 2 is a block diagram illustrating an exemplary active load director (ALD) server in the power load management system.

Referring now to FIG. 2, the ALD 100 may serve as the primary interface to customers, as well as to service personnel. In the exemplary embodiment depicted in FIG. 2, the ALD 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon database 134, a read meter application 136, and a security device manager 140.

In one embodiment, customers interact with the ALD 100 using the web browser interface 114, and subscribe to some or all of the services offered by the power load management system 10 via a customer sign-up application 116. In accordance with the customer sign-up application 116, the customer specifies customer personal settings 138 that contain information relating to the customer and the customer's residence or business, and defines the extent of service to which the customer wishes to subscribe. Customers may also use the web browser interface 114 to access and modify information pertaining to their existing accounts.

The ALD 100 also includes a UCC security interface 102 which provides security and encryption between the ALD 100 and a utility company's control center 200 to ensure that no third party is able to provide unauthorized directions to the ALD 100. A UCC command processor 104 receives and sends messages between the ALD 100 and the utility control center 200. Similarly, an ALC security interface 110 provides security and encryption between the ALD 100 and each ALC 300 on the system 10, ensuring that no third parties can send directions to, or receive information from, the ALC 300. The security techniques employed by the ALC security interface 110 and the UCC security interface 102 may include conventional symmetric key or asymmetric key algorithms, or proprietary encryption techniques.

The master event manager 106 maintains the overall status of the power load activities controlled by the power management system 10. The master event manager 106 maintains a separate state for each utility that is controlled and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD 100 and each ALC 300 within the system 10 through an ALC interface 112. For instance, the ALC manager 108 tracks the state of every ALC 300 serviced by specified utilities by communicating with the ALC 300 through an individual IP address. The ALC interface 112 translates instructions (e.g., transactions) received from the ALC manager 108 into the proper message structure understood by the targeted ALC 300 and then sends the message to the ALC 300. Likewise, when the ALC interface 112 receives messages from an ALC 300, it translates the message into a form understood by the ALC manager 108 and routes the translated message to the ALC manager 108.

The ALC manager 108 receives from each ALC 300 that it services, either periodically or responsive to polling messages sent by the ALC manager 108, messages containing the present power consumption and the status (e.g., "ON" or "OFF") of each device controlled by the ALC 300. Alternatively, if individual device metering is not available, then the total power consumption and load management status for the entire ALC 300 may be reported. The information contained in each status message is stored in the ALD database 124 in a record associated with the specified ALC 300. The ALD database 124 contains all the information necessary to manage every customer account and power distribution. In one embodiment, the ALD database 124 contains customer contact information and associated utility companies for all customers having ALCs 300 installed at their residences or businesses, as well as a description of specific operating instructions for each managed device (e.g., IP-addressable smart breaker or appliance), device status, and device diagnostic history.

Another message that can be exchanged between an ALC 300 and the ALC manager 108 is a status response message. A status response message reports the type and status of each device controlled by the ALC 300 to the ALD 100. When a status response message is received from an ALC 300, the ALC manager 108 logs the information contained in the message in the ALD database 124.

In one embodiment, upon receiving instructions (e.g., a "Cut" instruction) from the master event manager 106 to reduce power consumption for a specified utility, the ALC manager 108 determines which ALCs 300 and/or individually controlled devices to switch to the "OFF" state based upon present power consumption data stored in the ALD database 124. The ALC manager 108 then sends a message to each selected ALC 300 containing instructions to turn off all or some of the devices under the ALC's control.

A read meter application 136 may be optionally invoked when the UCC command processor 104 receives a "Read Meters" or equivalent command from the utility control center 200. The read meter application 136 cycles through the ALD database 124 and sends a read meter message or command to each ALC 300, or to ALCs 300 specifically identified in the UCC's command, via the ALC manager 108. The information received by the ALC manager 108 from the ALC 300 is logged in the ALD database 124 for each customer. When all the ALC meter information has been received, the information is sent to the requesting utility control center 200 using a business to business (e.g., ebXML) or other desired protocol.

Active Load Client

Figure 3:
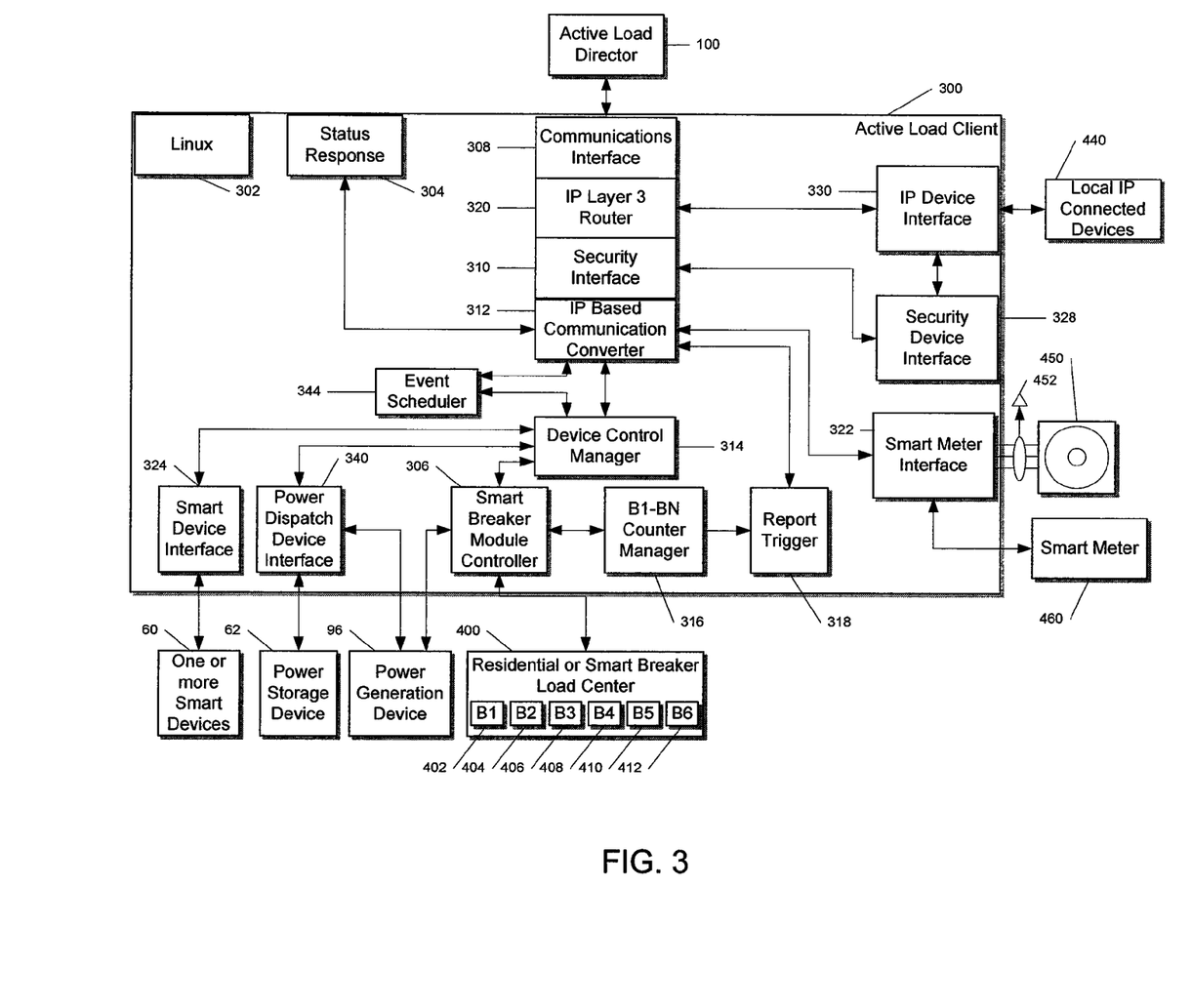
FIG. 3 is a block diagram illustrating an exemplary active load client and smart breaker module in the power load management system.

FIG. 3 illustrates a block diagram of an exemplary active load client 300 in accordance with one embodiment of the present invention. The depicted active load client 300 includes a smart breaker module controller 306, a communications interface 308, a security interface 310, an IP-based communication converter 312, a device control manager 314, a smart breaker (B1-BN) counter manager 316, an IP router 320, a smart meter interface 322, a smart device interface 324, an IP device interface 330, and a power dispatch device interface 340. The active load client 300, in this embodiment, is a computer or processor-based system located on-site at a customer's residence or business. The primary function of the active load client 300 is to manage the power load levels of controllable, power consuming load devices located at the residence or business, which the active load client 300 oversees on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. Finally, the power generation device 96 at the service point 20 sends data about power generated to the power dispatch device interface 340.

A communications interface 308 facilitates connectivity between the active load client 300 and the ALD server 100. Communication between the active load client 300 and the ALD server 100 may be based on any type of IP or other connection protocol including, but not limited to, the WiMax protocol. Thus, the communications interface 308 may be a wired or wireless modem, a wireless access point, or other appropriate interface.

A standard IP Layer-3 router 320 routes messages received by the communications interface 308 to both the active load client 300 and to any other locally connected device 440. The router 320 determines if a received message is directed to the active load client 300 and, if so, passes the message to a security interface 310 to be decrypted. The security interface 310 provides protection for the contents of the messages exchanged between the ALD server 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the IP router 320 may be programmed to route power load management system messages as well as conventional Internet messages. In such a case, the active load client 300 may function as a gateway for Internet service supplied to the residence or business instead of using separate Internet gateways or routers.

An IP based communication converter 312 opens incoming messages from the ALD server 100 and directs them to the appropriate function within the active load client 300. The converter 312 also receives messages from various active load client 300 functions (e.g., a device control manager 314, a status response generator 304, and a report trigger application 318), packages the messages in the form expected by the ALD server 100, and then passes them on to the security interface 310 for encryption.

The device control manager 314 processes power management commands for various controllable devices logically connected to the active load client 300. The devices can be either smart breakers 402-412 or other IP based devices 60, 460, such as smart appliances with individual control modules (not shown). The device control manager 314 also processes "Query Request" or equivalent commands or messages from the ALD server 100 by querying a status response generator 304 which maintains the type and status of each device controlled by the active load client 300, and providing the status of each device to the ALD server 100.

The status response generator 304 receives status messages from the ALD server 100 and, responsive thereto, polls each controllable device 402-412, 60, 460 under the active load client's control to determine whether the controllable device 402-412, 60, 460 is active and in good operational order. Each controllable device 402-412, 60, 460 responds to the polls with operational information (e.g., activity status and/or error reports) in a status response message. The active load client 300 stores the status responses in a memory associated with the status response generator 304 for reference in connection with power reduction events.

The smart device interface 324 facilitates IP or other address-based communications to individual devices 60 (e.g., smart appliance power control modules) that are attached to the active load client 300. The connectivity can be through one of several different types of networks including, but not limited to, BPL, ZigBee, Wi-Fi, Bluetooth, or direct Ethernet communications. Thus, the smart device interface 324 is a modem adapted for use in or on the network connecting the smart devices 60 to the active load client 300.

The smart breaker module controller 306 formats, sends, and receives messages to and from the smart breaker module 400. In one embodiment, the communications is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power used by each smart breaker 402-412 and stores the counted amounts of power in a memory of the active load client 300 associated with the counter manager 316.

The smart meter interface 322 manages either smart meters 460 that communicate using BPL or a current sensor 452 connected to a traditional power meter 450. When the active load client 300 receives a "Read Meters" command or message from the ALD server 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD server 100.

The Active Load Management System can be used by an electric power utility to manage energy demand using two-way measurement and control of devices within a service point. Performance curves derived from service point profiles and energy consumption variability factors such as weather data are used to control energy usage at the service point through minor manipulation of interruptible controlled energy consuming devices.

Customer energy profiles can be created using historical energy consumption data from the ALC and additional "variability factors" that measure other characteristics that may affect energy consumption. This information can be used in planning how to manage a customer's bill.

The embodiments encompass a method and apparatus for controlling interruptible energy using devices at a service point to achieve a customer bill that is within a controlled pricing envelope on IP-based networks utilizing the Active Load Director (ALD) and IP-capable two-way gateway in the Active Load Client (ALC). The disclosed embodiments expand upon conventional data processing/handling algorithms/techniques, applying them to the processing of unique load management control and informational data in an environment that allows utility customers to view and manage the total cost of their energy bills.

Utility customers are offered various types of billing including flat rate billing and flat rate usage. These and other offerings can be met through the implementation of two-way reporting devices and metering as described in US 2009/0062970. In one embodiment, the reporting devices are manipulated with the assistance of software, processors, and memory on the Active Load Client. In this embodiment, a reporting thermostat, sensors, device controllers and two reporting relays comprise the ecosystem for this implementation.

With the inputs of weather data, either empirical data as reported by outside sensors or weather data from the nearest public reporting station, and with derived drift or rate of temperature decay information, a heuristic, dynamic heating and cooling envelope can be derived for all devices attached to the ALC, including the reporting meter. Further input data may include previous billing and usage information from the serving utility. The performance curves created from this data provide baseline performance and usage data for the service point, creating a reference point from which to start billing analysis and resulting device control.

Either the customer or the utility can decide to implement a bill management system for the service point. The bill management feature is provided to the utility to manage no pay or slow pay customers' energy usage within specified limits. The customer initiates the program by creating the customer's own bill management parameters and sending the parameters to the ALD server. The ALD server then controls the devices within participating service points by cutting power in small increments that are either time-based or usage triggered.

In one embodiment, a feedback mechanism is implemented over the carrier networks to update the ALD. The Active Load Client communicates with the reporting devices at an adjustable rate, but not less than a minimum rate to provide sufficient feedback from the controlled devices within the service point that will enable effective control and power savings (typically within a matter of minutes).

This embodiment identifies both energy consumption rates and energy consumption targets, and then adjusts temperature-based devices up or down as needed or cuts power to non-temperature based devices as needed. Non-temperature based controllable devices also are referred to herein as duty-cycle based devices, wherein the duty-cycle is a measure of the amount of time the associated device is powered on during a specified period of time. The adjustments are performed to help reach the target energy consumption rates and targets. The system will report dynamically the usage information of the customer's accumulated and predicted usage.

If the feedback mechanism is allowed to run uncorrected over a period of time, the standard deviation around the mean value of the energy consumption target and the actual reporting error around the pricing envelope will improve over time.

In another embodiment, a customer service representative can perform the bill management functions on behalf of a customer. This is an extension of other embodiments so that a customer service representative has access to the customer's account.

In another embodiment, variability factor metrics are used to make adjustments to the estimated bill for the current billing period. In yet another embodiment, the bill can be measured in any combination of currency, kilowatt hours, and/or carbon credits instead of merely currency.

Although the embodiments disclosed herein measure usage on a real-time basis, additional embodiments could include usage measuring in minutes, hours, days, weeks, or months.

The embodiments disclosed can manage other devices within the service point as manufacturers make interfaces available to the ALMS. The bill management application can use those device interfaces as an input to estimate bills whether the ALMS actually manages power consumption of those devices.

Figure 4:
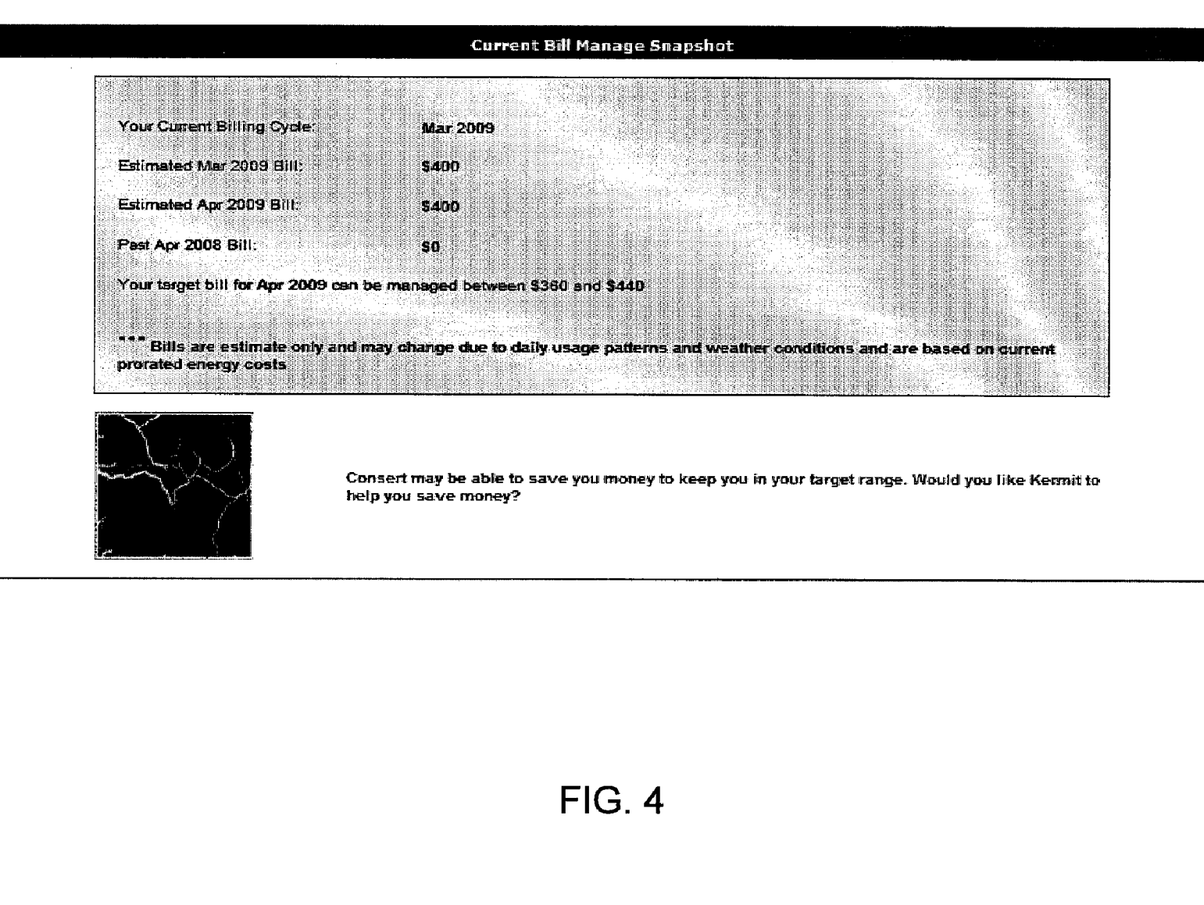
FIG. 4 is a screen shot of an exemplary Current Bill Management Snapshot screen.

Prior to initiating the Bill Manage application, the customer can use the ALMS Customer sole 98 to view the customer's current bill summary. FIG. 4 illustrates an exemplary screenshot of how the application may be implemented. As depicted in this figure, the customer can view the following: (1) current billing cycle month; (2) estimated bill for the current month; (3) estimated bill for the next month; and (4) bill amount for the same month in the previous calendar year. Although FIG. 4 shows billing amounts in dollars, it should be realized that billing amounts could be provided in other currencies.

In another embodiment, the number of kilowatt hours and cost per kilowatt hour for the previous year is obtained from the Active Load Director database 124 along with the current projected kilowatt hour for the next month and the cost per kilowatt. This information is used to display to the customer using the web browser 114, the previous year's bill and the current projected bill using the same cost per kilowatt. The displayed information can help the customer determine what billing cap is feasible given similar months.

Figure 5:
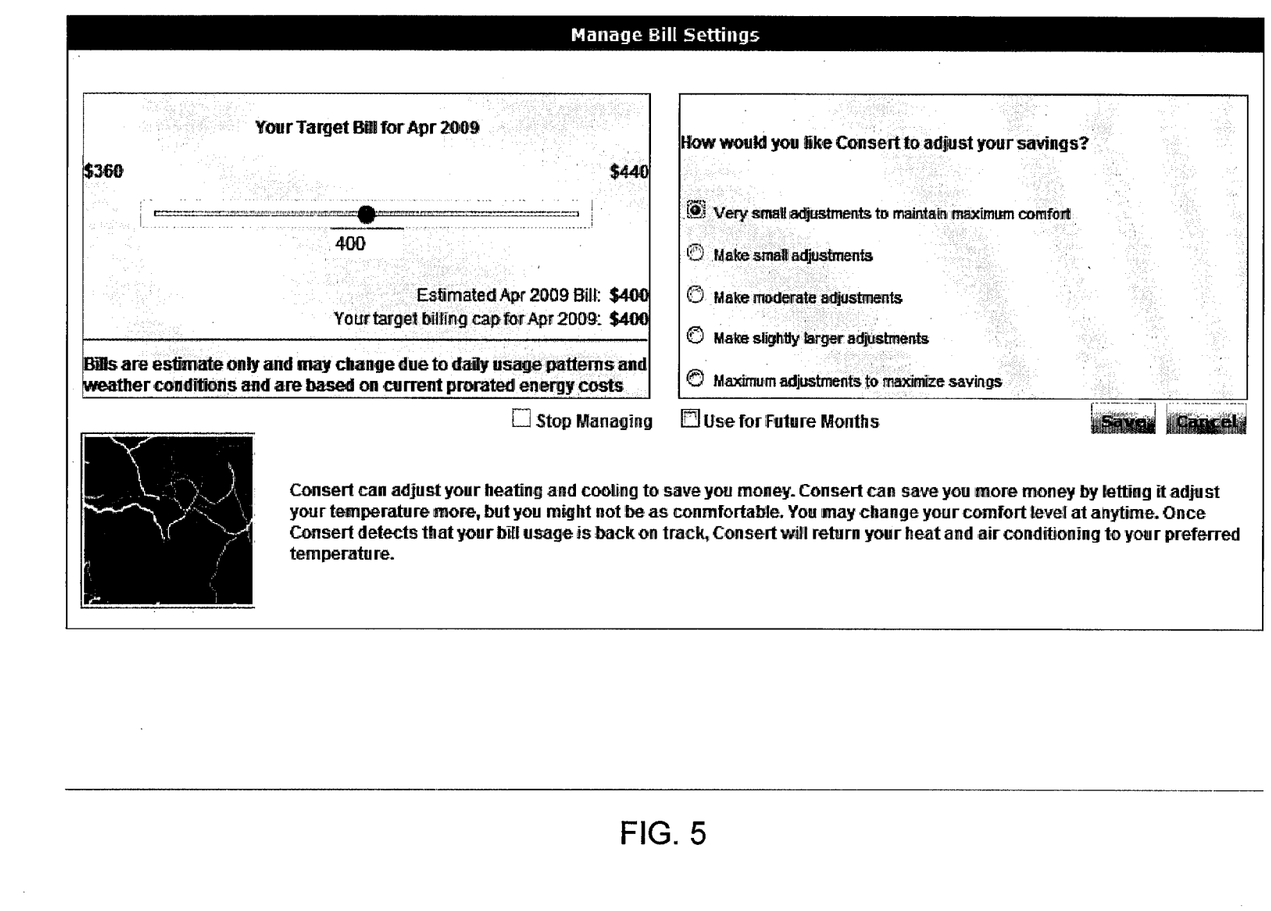
FIG. 5 is a screen shot of an exemplary Manage Bill Settings screen.

When the customer wants to place a limit (or cap) on the next month's bill, the customer uses the ALMS Customer Console 98 to select a page that shows the estimated bill for the next month plus the limits within which the customer can adjust the bill. An exemplary screen shot is shown in FIG. 5. For example, if the estimated bill was $400, the screen will display bill amounts that are 10% over ($440) and below ($360) the estimated cost. The customer can then select a dollar amount between those outer limits as a desired cap on the bill for the next month. As previously described, this information is obtained by the web browser 114 from the customer personal settings 138, which obtains the appropriate billing data from the Active Load Director Database 124. This is just one implementation of how the customer specifies settings for bill management.

In addition, the same user interface allows the customer to indicate the degree of aggressiveness that may be taken to implement the limit. For example, the types of actions that could be taken can include, but are not limited to: (1) major adjustments allowed, (2) moderate adjustments allowed, (3) minor adjustments allowed, etc. Each aggressiveness option has an associated temperature range delta for temperature-based devices and/or an associated duty cycle delta for non-temperature based devices. The user is also given the option to end bill management or to use the current bill cap for future months. Once the bill cap has been selected, the Active Load Director Server 100 uses data passed from the ALMS Customer Console 98 to indicate that the service point is in bill management mode. This indication is stored in the Active Load Director Data Base 124.

In addition, the Active Load Director Server 100 can pass the following to the Active Load Client: (1) management mode indicator; (2) temperature thresholds based on customer preferences; (3) duty cycle of non-temperature based devices; (4) target amount of energy to be used in a specified time period; (5) schedule of control events based on the customer's preferences. With further reference to FIG. 2, this information is sent via the Active Load Client Manager 108 through the Active Load Client Interface 112 to the Active Load Client 300.

With further reference to FIG. 3, the information is passed through the Communications Interface 308, IP Layer 3 Router 320, Security Interface 310, and IP Based Communication Converter 312 to the Event Scheduler 344. The Event Scheduler process 344 of the ALC will begin initiating control events in devices when the billing cycle begins, using the information passed to it. If at some point the customer revokes bill management for the billing cycle, that information is sent via the same route to turn off control event scheduling in the Event Scheduler 344.

Bill Management Server Algorithm

Figure 6:
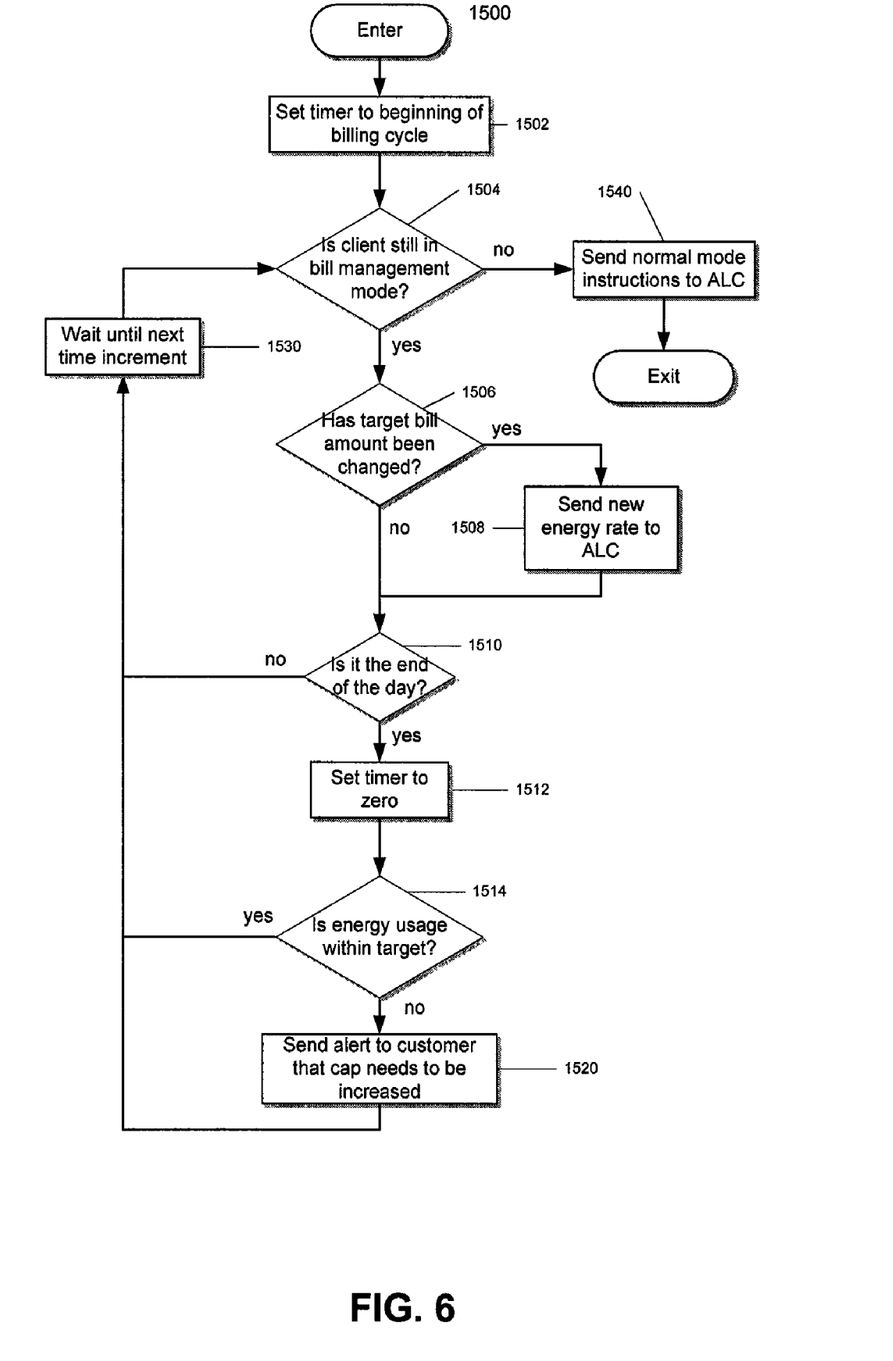
FIG. 6 is an operational flow diagram of an exemplary Bill Management Server algorithm.

While the customer has turned on bill management, the ALD Server 100 executes the exemplary Bill Management Server algorithm 1500 shown in FIG. 6. This takes place within the Active Load Client Manager 108 (FIG. 2) of the ALD for the specific Active Load Client being managed. The processing depicted in the Bill Management Server algorithm 1500 occurs in time increments of specified time periods.

First, the processing logic sets the timer to the beginning of the billing cycle, down to the second, as indicated in logic block 1502. Then, it determines if the ALC is still in bill management mode as indicated in decision block 1504. The customer can turn off bill management mode at any time. If the ALC is not in bill management mode, then instructions are sent to the ALC to operate in normal mode and the algorithm ends. This step is indicated in logic block 1540.

If the ALC is still in bill management mode, the processing logic checks to see if the target bill amount has been changed as indicated in decision block 1506. The target bill amount could be changed by the customer or a customer service representative. If the target bill amount has been changed, then the new energy rate is sent to the ALC as indicated in logic block 1508.

Next, the processing logic determines if the end of the day has been reached, as indicated in decision block 1510. If the end of the day has not been reached, then the timer waits until the next time increment (logic block 1530), and the processing logic returns to decision block 1504. If the end of the day has been reached, then the timer is set to zero as indicated in logic block 1512, and there is a check to determine if the projected energy usage of the service point is within the limit specified by the customer (decision block 1514). If the projected energy usage has not exceeded the target, then the timer waits until the next time increment (logic block 1530), and the processing logic returns to decision block 1504.

Projected energy usage is calculated by taking actual energy usage during the billing period and adding an amount "A" which is the rate of usage during this billing period multiplied by the number of days left in the billing cycle. This also takes into account a leeway percentage within which the amount "A" must fall to be considered still within target. For instance, if the leeway percentage is 10%, then A is reduced by 10% when calculating projected energy usage. Otherwise, the service point is considered to be over the limit.

If the energy usage of the service point is not within the limit set by the customer in decision block 1514, an alert is sent to the customer that the billing cap needs to be increased, as indicated in logic block 1520. In addition, the timer waits until the next time increment (logic block 1530), and the processing logic returns to decision block 1504.

Bill Management Client Algorithm

Figure 7:
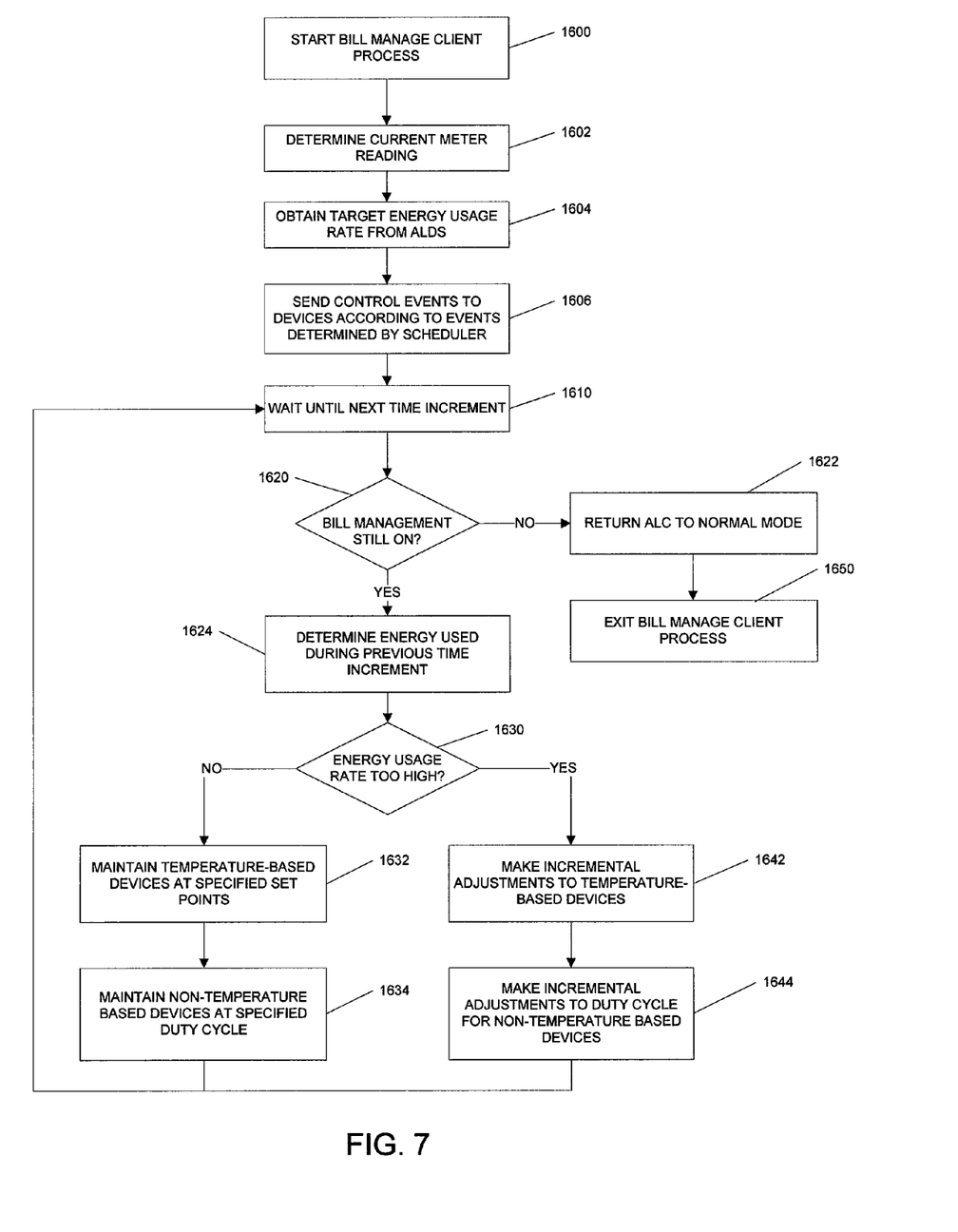
FIG. 7 is an operational flow diagram of an exemplary Bill Management Client algorithm.

When the ALC is in bill manage mode, it operates according to the Bill Management Client algorithm 1600 in FIG. 7. This is performed by the Device Control Manager 314 of the ALC (FIG. 3). The processing depicted in Bill Management Client Algorithm 1600 works on the concept of time increments which are set by the Active Load Client.

Initially, the processing logic records the current meter reading for the service point using the Smart Meter Interface 322, as indicated in logic block 1602, and retrieves the target energy usage rate previously sent by the ALD Server, as indicated in logic block 1604. This rate is calculated by the ALD Server and sent by the Bill Management Server algorithm 1500 in logic block 1508. Next, the Event Scheduler 344 initiates the sending of control events to devices within the service point at appropriate intervals as indicated in logic block 1606. This schedule conforms to the customer preferences for how aggressively to try to meet the billing target.

The processing logic waits until the next time increment as indicated in logic block 1610. At that time, the processing logic determines, in decision block 1620, if the service point is still in bill management mode. This is because the customer may decide to get out of bill management mode at any time. If the service point is no longer in bill management mode, then the ALC is changed to normal mode, as indicated in logic block 1622, and the algorithm ends.

However, if the service point is still in bill management mode in decision block 1620, then the ALC obtains the latest meter reading from the Smart Meter Interface 322 and determines the amount of energy used during the previous time increment. These steps are indicated in logic block 1624. If the energy usage during the last time increment is determined in decision block 1630 to be more than the target energy usage for a time increment (as calculated previously), then the Device Control Manager 314 makes incremental temperature adjustments to temperature-based devices (logic block 1642), and continues to maintain the non-temperature based devices at the control schedule set by the Event Scheduler 344 (logic block 1644).

Otherwise, if the energy usage for the last time increment is less than or equal to the targeted energy rate, then the Device Control Manager 314 maintains temperature-based devices at the set points specified by customers (logic block 1632) and maintains non-temperature based devices as specified by customers (logic block 1634). After this processing step, the processing logic 1600 loops back to logic block 1610 to wait until the next time increment for resuming processing at decision block 1620.

Safety Margin

The utility may configure the bill management function in additional ways to account for unforeseen difficulties reaching the customer's target bill or for accounting for the cost of bill management. There are a number of additional embodiments to allow the utility to configure the application. One embodiment adds a "safety margin" to the target bill to account for unforeseen weather or usage events that affect energy consumption. The safety margin consists of a "safety percentage" and a "safety time." The percentage is the actual percent of the target bill amount to which the ALMS will manage the bill. For example, if the percentage is 90% and the target bill amount is $400, then the ALMS will target a bill of $360. By managing to this reduced amount, the ALMS is better able to reach the targeted bill amount. The adjusted bill target is used internally by the ALMS, but the original bill target is communicated to the customer. The safety time is the number of days before the end of the billing cycle when the safety percentage is no longer in effect, e.g. five days.

Accounting for Cost of the Service

Another embodiment used by the utility to configure the bill management function is to take into account the cost of providing the bill management service. This can be specified as a currency amount or as a percentage of the overall bill. The service cost would be subtracted from the targeted bill amount. For example, if the utility wants to charge $3 for the bill management service and the targeted amount is $200, then the adjusted bill target is $197.

These last two embodiments can be used in combination. For example, if the targeted bill is $200, the bill management service costs $3, and the safety percentage is 90%, then the adjusted bill target is ($200×0.9)−$3=$177.

Status and Opting Out

With the ALMS in bill management mode, the customer can view the status and progress of bill management. The progress/status can include the following: (1) target billing amount; (2) cumulative billing to date; (3) trend lines; and (4) projections based on current usage. The target billing amount is the billing amount the customer is trying to achieve. The cumulative billing to date is the current billing amount based on energy used thus far. Trend lines represent typical usage by similar customers. This can include historical trends during a similar time period or an estimation of bills based on outside temperature. Projection lines based on current usage show bill amounts at various points in the current billing cycle based on current bill management preferences. All of this information can be presented in textual and/or graphical form.

As described above, the customer can decide to cancel bill management at any time. In one embodiment, the user can make a simple indication to cancel the function, as shown in FIG. 5. In another embodiment, the ALMS records when the customer initiated bill management and prompts the customer at intervals selected by the power utility concerning whether or not to continue bill management. This prompts the customer to check his/her bill management progress and make an active decision whether to continue. In still another embodiment, the utility selects a percentage over or above the target bill and queries the customer about whether to continue bill management once the customer reaches that percentage.

In yet another embodiment, options can be sent to the customer when the customer is presented with the decision whether or not to continue bill management. The customer can be provided with a variety of options, including, but not limited to, the following: (1) continue trying to manage the bill using current settings, even if estimates show the target will not be achieved; (2) change the target bill; or (3) cancel bill management.

Energy Credits

In one embodiment, energy consumption can be limited for those using energy credits. Energy credits are often made available to customers who have financial limitations and are unable to pay for increased energy usage during times such as very cold or hot time periods. This embodiment allows selective electricity usage by devices for economically challenged customers. For example, in the telecommunications industry, a prepaid subscription for services allows a customer to consume the number of minutes of use and/or ancillary services such as texting until the usage exceeds the payment. In this embodiment, the customer selects which devices the customer is willing to pay for using energy credits. The electric utility allows the customer to decide which devices may be paid for using credits. This represents an opportunity previously unavailable to electric utilities to allow a customer to create custom "buckets" of electricity usage per device, known in the telecommunications industry as bucket plans. The utility can also further constrain electricity usage in bucket plans. For example, hot water can be available for mornings or evenings only instead of not at all. Furthermore, cooling can be available for the hottest part of the day, or heating for the coolest part of the evenings. and a reduced temperature for other times.

A further embodiment allows for customers using bucket plans to be constrained by time of use pricing such that the ALMS can be programmed by the serving utility and with the customer's consent to consume more electricity when it is "off peak" for the utility, and restrict heavily the usage during peak times such that a continuity of service is maintained without interruption, and the accumulated usage is always known to the customer and the utility through two-way communicating thermostats, home displays, web-based user interfaces or customer service phone support. The intent is to utilize technology to reduce bad debts of the serving utilities while providing options, through the ALMS, for those customers with financial limitations.

As described above, the disclosed embodiments encompass a method and apparatus for controlling interruptible energy using devices at a service point to meet a target billing rate on IP-based networks utilizing an Active Load Director (ALD) and IP-capable two-way gateway. The disclosed embodiments expand upon conventional data processing/handling algorithms/techniques, applying them to the processing of unique load management control and informational data in an environment that allows utility customers to view and manage the total cost of their energy bills. The customer can specify an amount to which the Active Load Management System will attempt to limit the customer's bill. This involves scheduling control events to meet a specific cost limit set by the customer.

It should be noted that many acronyms are used in this description that are well-defined in the telecommunications and computer networking industries and are well understood by persons skilled in these arts. Complete descriptions of these acronyms, whether defining a telecommunications standard or protocol can be found in readily available online literature and are not described in any detail herein.

As used in the foregoing description, the term "ZigBee" refers to any wireless communications protocol adopted by the Institute of Electrical and Electronics Engineers (IEEE) according to standard 802.15.4 or any successor standard(s), the term "Wi-Fi" refers to any communications protocol adopted by the IEEE under standard 802.11 or any successor standard(s), the term "WiMax" refers to any communications protocol adopted by the IEEE under standard 802.16 or any successor standard(s), and the term "Bluetooth" refers to any short-range communications protocol implementing IEEE standard 802.15.1 or any successor standard(s). The term "High Speed Packet Access (HSPA)" refers to any communications protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communications protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communications protocol adopted by the ITU under standard number TIA-856 Rev. A.

It will be appreciated that embodiments of the invention described herein can be comprised of one or more conventional processors and unique stored program instructions that control the one or more processors to implement, in conjunction with certain non-processor circuits, some, most, or all of the functions for managing power load distribution, and tracking and controlling individual subscriber power consumption and savings in one or more power load management systems, and achieving a target customer bill within a controlled pricing envelope. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

In the foregoing specification, the invention has been described with reference to specific embodiments. However, one of ordinary skill in the art will appreciate that various modifications and changes may be made without departing from the scope of the present invention as set forth in the appended claims. For example, the disclosed load management system is applicable for managing and limiting billing costs for individual customers. Additionally, the functions of specific modules within the ALD server 100 and active load client 300 may be performed by one or more equivalent means. Accordingly, the specification and drawings are to be regarded in an illustrative rather than a restrictive sense, and all such modifications are intended to be included within the scope of the present invention.

The corresponding structures, materials, acts, and equivalents of all means plus function elements in any claims below are intended to include any structure, material, or acts for performing the function in combination with other claim elements as specifically claimed.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed is:

1. A method for controlling a power-consuming device at a service point to manage a customer's electrical bills using a communications network between a server in communication with an electric utility and a client device at the service point, comprising the steps of:

transmitting a plurality of customer bill management settings to the server from the client device at the service point including at least a target energy usage for a specified billing period;

storing the plurality of customer bill management settings in a database for use in energy usage control events;

determining a current meter reading by the client device at the service point;

scheduling an energy usage control event for the power-consuming device at the service point based on the current meter reading and the target energy usage;

sending the energy usage control event to the power-consuming device at a scheduled time to control an energy usage at the service point;

determining the energy usage at the service point during a specified time interval;

comparing a projected energy usage, based on the energy usage during the specified time interval, with the target energy usage for the specified billing period; and determining if the projected energy usage exceeds the target energy usage during the billing period.

2. The method for controlling a power-consuming device of claim 1 further comprising sending incremental adjustments to a temperature-based power-consuming device if the projected energy usage exceeds the target energy usage during the billing period.

3. The method for controlling a power-consuming device of claim 1 further comprising maintaining a duty-cycle based power-consuming device at the duty cycle indicated in the energy usage control event if the projected energy usage exceeds the target energy usage during the billing period.

4. The method for controlling a power-consuming device of claim 1 further comprising maintaining a temperature-based power-consuming device at a set point included in the bill management settings if the projected energy usage is less than the target energy usage during the billing period.

5. The method for controlling a power-consuming device of claim 1 further comprising maintaining a duty-cycle based power-consuming device at a specified duty cycle if the projected energy usage is less than the target energy usage during the billing period.

6. The method for controlling a power-consuming device of claim 1 further comprising providing a user interface to enable the customer to enter and revise the plurality of customer bill management settings.

7. The method for controlling a power-consuming device of claim 6 wherein the plurality of customer bill management settings includes an action for the power-consuming device to initiate in the energy usage control event.

8. The method for controlling a power-consuming device of claim 7 wherein the action for the power-consuming device to initiate in the energy usage control event includes an adjustment varying from a minimal adjustment to maintain a maximum comfort level for the customer to a maximum adjustment to maximize an energy savings for the customer.

9. The method for controlling a power-consuming device of claim 8 wherein each of the optional adjustment actions to initiate in the scheduled energy usage control event includes an associated temperature range for a temperature-based power-consuming device.

10. The method for controlling a power-consuming device of claim 8 wherein each of the optional adjustment actions to initiate in the scheduled energy usage control event includes an associated duty cycle for a duty-cycle based power-consuming device.

11. The method for controlling a power-consuming device of claim 1 further comprising dynamically reporting an accumulated energy usage for the billing period and a projected energy usage for the billing period to the server in communication with the electric utility.

12. The method for controlling a power-consuming device of claim 1 further comprising receiving an alert from the server in communication with the electric utility if the projected energy usage exceeds the target energy usage during the billing period.

13. The method for controlling a power-consuming device of claim 1 further comprising adjusting the target energy usage by a safety margin to account for unexpected weather conditions or energy usage events affecting energy usage at the service point.

14. The method for controlling a power-consuming device of claim 13 wherein the safety margin comprises a safety percentage and a safety time.

15. The method for controlling a power-consuming device of claim 14 wherein the safety percentage is a percentage of the target energy usage for use in scheduling and sending the energy usage control event.

16. The method for controlling a power-consuming device of claim 14 wherein the safety time comprises a number of days before the end of the billing period that the safety percentage is no longer in effect.

17. The method for controlling a power-consuming device of claim 1 further comprising receiving from the server in communication with the electric utility at least one of the following: a management mode indicator; a temperature threshold for a temperature-based power-consuming device based on customer bill management settings; a duty cycle for a duty-cycle based power-consuming device; a target energy usage for the specified time interval; and a schedule of control events based on customer bill management settings.

18. The method for controlling a power-consuming device of claim 6 further comprising providing the customer with a current bill summary via the user interface, herein the bill summary includes at least one of a current billing cycle month, an estimated bill for the current month, an estimated bill for a next month, and a bill mount for a same month in a preceding year.

19. The method for controlling a power-consuming device of claim 1 further comprising enabling the customer to obtain energy credits and to select the power-consuming device to which the energy credits are applied.

20. The method for controlling a power-consuming device of claim 19 further comprising enabling the customer to create a bucket plan of energy use for the selected power-consuming device wherein the bucket plan is constrained by the utility based on at least one criterion.

21. The method for controlling a power-consuming device of claim 20 wherein the at least one bucket plan constraint criterion includes at least one of a time of day use, a peak hours use, and an off-peak hours use.

22. The method for controlling a power-consuming device of claim 19 further comprising receiving an accumulated energy credit usage data from the electric utility via the server in communication with the electric utility.

23. A system for controlling a power-consuming device at a service point to manage a customer's electrical bills using a communications network between a server in communication with an electric utility and a client device at the service point, comprising:
   a memory storing a database for use in energy usage control events containing a plurality of customer bill management settings including at least a target energy usage for a specified billing period;
   a processor, cooperative with the memory, and configured for managing the customer's electrical bills using the communications network by:
      determining a current meter reading by the client device at the service point;
      scheduling an energy usage control event for the power-consuming device at the service point based on the current meter reading and the target energy usage;
      sending the energy usage control event to the power-consuming device at a scheduled time to control an energy usage at the service point;
      determining the energy usage at the service point during a specified time interval;
      comparing a projected energy usage, based on the energy usage during the specified time interval, with the target energy usage for the specified billing period; and
      determining if the projected energy usage exceeds the target energy usage during the billing period.

24. The system for controlling a power-consuming device of claim 23 wherein the processor is further configured for sending incremental adjustments to a temperature-based power-consuming device if the projected energy usage exceeds the target energy usage during the billing period.

25. The system for controlling a power-consuming device of claim 23 wherein the processor is further configured for maintaining a duty-cycle based power-consuming device at the duty cycle indicated in the energy usage control event if the projected energy usage exceeds the target energy usage during the billing period.

26. The system for controlling a power-consuming device of claim 23 wherein the processor is further configured for maintaining a temperature-based power-consuming device at a set point included in the bill management settings if the projected energy usage is less than the target energy usage during the billing period.

27. The system for controlling a power-consuming device of claim 23 wherein the processor is further configured for maintaining a duty-cycle based power-consuming device at a specified duty cycle if the projected energy usage is less than the target energy usage during the billing period.

28. The system for controlling a power-consuming device of claim 23 wherein the processor is further configured for providing a user interface to enable the customer to enter and revise the plurality of customer bill management settings.

29. The system for controlling a power-consuming device of claim 28 wherein the processor is further configured for initiating an action for the power-consuming device to perform in the energy usage control event.

30. The system for controlling a power-consuming device of claim 29 wherein the action for the power-consuming device that the processor is further configured for initiating in the energy usage control event includes an adjustment varying from a minimal adjustment to maintain a maximum comfort level for the customer to a maximum adjustment to maximize an energy savings for the customer.

31. The system for controlling a power-consuming device of claim 29 wherein the adjustment action includes an associated temperature range for a temperature-based power-consuming device.

32. The system for controlling a power-consuming device of claim 29 wherein the adjustment action includes an associated duty cycle for a duty-cycle based power-consuming device.

33. The system for controlling a power-consuming device of claim 23 wherein the processor is further configured for reporting an accumulated energy usage for the billing period and a projected energy usage for the billing period to the server in communication with the electric utility.

34. The system for controlling a power-consuming device of claim 23 wherein the processor is further configured for receiving an alert from the server in communication with the electric utility if the projected energy usage exceeds the target energy usage during the billing period.

35. The system for controlling a power-consuming device of claim 23 wherein the processor is further configured for adjusting the target energy usage by a safety margin to account for unexpected weather conditions or energy usage events affecting energy usage at the service point.

36. The system for controlling a power-consuming device of claim 35 wherein the safety margin comprises a safety percentage and a safety time.

37. The system for controlling a power-consuming device of claim 36 wherein the safety percentage is a percentage of the target energy usage for use in scheduling and sending the energy usage control event.

38. The system for controlling a power-consuming device of claim 36 wherein the safety time comprises a number of days before the end of the billing period that the safety percentage is no longer in effect.

39. The system for controlling a power-consuming device of claim 28 wherein the processor is further configured for receiving from the server in communication with the electric utility at least one of the following: a management mode indicator; a temperature threshold for a temperature-based power-consuming device based on customer bill management settings; a duty cycle for a duty-cycle based power-consuming device; a target energy usage for the specified time interval; and a schedule of control events based on customer bill management settings.

40. The system for controlling a power-consuming device of claim 28 wherein the processor is further configured for providing the customer with a current bill summary via the user interface, herein the bill summary includes at least one of a current billing cycle month, an estimated bill for the current month, an estimated bill for a next month, and a bill mount for a same month in a preceding year.

41. The system for controlling a power-consuming device of claim 23 wherein the processor is further configured for enabling the customer to select the power-consuming device to which an energy credit is applied.

42. The system for controlling a power-consuming device of claim 41 wherein the processor is further configured for enabling the customer to create a bucket plan of energy use for the selected power-consuming device wherein the bucket plan is constrained by the utility based on at least one criterion.

43. The system for controlling a power-consuming device of claim 42 wherein the at least one bucket plan constraint criterion includes at least one of a time of day use, a peak hours use, and an off-peak hours use.

44. The system for controlling a power-consuming device of claim 41 wherein the processor is further configured for receiving an accumulated energy credit usage data from the electric utility via the server in communication with the electric utility.

* * * * *